United States Patent
Wishneski et al.

(10) Patent No.: US 10,494,471 B2
(45) Date of Patent: Dec. 3, 2019

(54) SYSTEM AND METHOD FOR FORMING A POLYURETHANE FOAM INCLUDING ON DEMAND INTRODUCTION OF ADDITIVE TO RESIN COMPONENT

(71) Applicant: BASF SE, Ludwigshafen (DE)

(72) Inventors: Todd William Wishneski, Missouri City, TX (US); Gregory Bryan Carter, Houston, TX (US); Marcus J. Hunter, Cypress, TX (US); Mario Jean-Rejouis, Houston, TX (US); Peter Noel Longtin, League City, TX (US)

(73) Assignee: BASF SE, Ludwigshafen am Rhein (DE)

( * ) Notice: Subject to any disclaimer, the term of this patent is extended or adjusted under 35 U.S.C. 154(b) by 1 day.

(21) Appl. No.: 14/772,952

(22) PCT Filed: Mar. 14, 2014

(86) PCT No.: PCT/US2014/027122
§ 371 (c)(1),
(2) Date: Sep. 4, 2015

(87) PCT Pub. No.: WO2014/152250
PCT Pub. Date: Sep. 25, 2014

(65) Prior Publication Data
US 2016/0009848 A1 Jan. 14, 2016

Related U.S. Application Data

(60) Provisional application No. 61/786,901, filed on Mar. 15, 2013.

(51) Int. Cl.
*B29C 44/34* (2006.01)
*B29C 44/36* (2006.01)
(Continued)

(52) U.S. Cl.
CPC ...... *C08G 18/3221* (2013.01); *B01J 19/0006* (2013.01); *B01J 19/18* (2013.01);
(Continued)

(58) Field of Classification Search
CPC .. B01J 19/0006–004; B01J 2219/00182; B01J 19/00–325; B05B 7/0018–0068;
(Continued)

(56) References Cited

U.S. PATENT DOCUMENTS 3,361,412 A * 1/1968 Cole, III .................. B29B 7/325
138/42
5,006,501 A * 4/1991 Tamano ............. C08G 18/1875
502/167
(Continued)

FOREIGN PATENT DOCUMENTS

CA       2002274 A1 *  5/1990  ............. B01F 3/088
JP    2001-316442 A    11/2001
(Continued)

OTHER PUBLICATIONS 2,4,4,4-Tetraflouro-1-Butene Information. ChemicalBook. http://www.chemicalbook.com/ChemicalProductProperty_EN_CB5773853.htm. As viewed on May 2, 2017.*
(Continued)

*Primary Examiner* — Stephen E Rieth
(74) *Attorney, Agent, or Firm* — DLA Piper LLP (US)

(57) ABSTRACT

A system and method for forming a polyurethane foam includes supplying an isocyanate component from a source of isocyanate to a proportioner. A resin component from a source of resin is supplied to a metering unit and an additive having an unstable state from a source of additive is supplied to the metering unit. The resin component and the additive form a reactive mixture when combined. The system and method includes delivering the reactive mixture by the
(Continued)

metering unit to an accumulator and storing the reactive mixture in the accumulator. The system and method further includes demanding a supply of the reactive mixture with the proportioner and supplying the reactive mixture by the accumulator to the proportioner and mixing the reactive mixture with the isocyanate component by the proportioner to form the polyurethane foam.

11 Claims, 8 Drawing Sheets

(51) Int. Cl.

| | | |
|---|---|---|
| *C08J 9/14* | (2006.01) | |
| *B05B 12/14* | (2006.01) | |
| *B05B 7/32* | (2006.01) | |
| *B01J 19/00* | (2006.01) | |
| *B01J 19/18* | (2006.01) | |
| *C08G 18/32* | (2006.01) | |
| *B05B 7/00* | (2006.01) | |
| *B05B 7/02* | (2006.01) | |
| *C08G 101/00* | (2006.01) | |

(52) U.S. Cl.
CPC ............ *B05B 7/0018* (2013.01); *B05B 7/02* (2013.01); *B05B 7/32* (2013.01); *B05B 12/1418* (2013.01); *B29C 44/3446* (2013.01); *B29C 44/367* (2013.01); *C08G 18/3206* (2013.01); *C08J 9/144* (2013.01); *B01J 2219/00182* (2013.01); *C08G 2101/00* (2013.01); *C08J 2203/162* (2013.01); *C08J 2375/04* (2013.01)

(58) Field of Classification Search
CPC .......... B05B 12/1418–1445; B05B 12/14–40; B05B 11/30–3098
See application file for complete search history.

(56) References Cited

U.S. PATENT DOCUMENTS

| | | | |
|---|---|---|---|
| 5,127,552 A * | 7/1992 | Bauman | B29B 7/7668 |
| | | | 222/132 |
| 5,846,461 A | 12/1998 | Collins et al. | |
| 5,958,991 A * | 9/1999 | Bartlett, Jr. | B29C 44/3442 |
| | | | 252/182.24 |
| 6,262,139 B1 | 7/2001 | Narayan et al. | |
| 6,960,618 B2 | 11/2005 | Ohnuma et al. | |
| 7,717,357 B2 | 5/2010 | Gatenbein et al. | |
| 8,293,807 B2 | 10/2012 | Emge et al. | |
| 8,466,207 B1 | 6/2013 | Whinnery, Jr. et al. | |
| 2003/0171445 A1* | 9/2003 | Isobe | B29B 7/7404 |
| | | | 521/155 |
| 2006/0091574 A1 | 5/2006 | Mellentine et al. | |
| 2007/0254973 A1 | 11/2007 | Emge et al. | |
| 2011/0305865 A1 | 12/2011 | Cocconi et al. | |
| 2012/0046372 A1 | 2/2012 | Bogdan et al. | |
| 2012/0180400 A1 | 7/2012 | Benson-Sargent et al. | |
| 2013/0295371 A1 | 11/2013 | Peterson et al. | |
| 2013/0316164 A1 | 11/2013 | Peterson et al. | |

FOREIGN PATENT DOCUMENTS

| | | | | |
|---|---|---|---|---|
| WO | WO 2011050017 A1 * | 4/2011 | | C08J 9/146 |
| WO | WO 2012169967 A1 * | 12/2012 | | B29C 44/3446 |
| WO | WO-2013012427 A1 * | 1/2013 | | C08G 18/3203 |

OTHER PUBLICATIONS

Definition of relay. Black's Law Dictionary. https://thelawdictionary.org/relay/. As viewed on Nov. 15, 2018. (Year: 2018).*
International Search Report for Application No. PCT/US2014/027122 dated Jul. 15, 2014, 4 pages.
Graco, "Fast-Set Plural-Component Equipment and Accessories for Foam and Coatings Applications", pp. 1-24, Mar. 2012.
English language abstract and machine-assisted English translation for JP 2001-316442 extracted from espacenet.com database on Sep. 30, 2015, 38 pages.

* cited by examiner

SYSTEM AND METHOD FOR FORMING A POLYURETHANE FOAM INCLUDING ON DEMAND INTRODUCTION OF ADDITIVE TO RESIN COMPONENT

CROSS-REFERENCE TO RELATED APPLICATION(S)

This application is the National Stage of International Patent Application No. PCT/US2014/027122, filed on Mar. 14, 2014, which claims priority to and all the advantages of United States Patent Application No. 61/786,901, filed on Mar. 15, 2013, the content of which is incorporated herein by reference.

BACKGROUND OF THE INVENTION

1. Field of the Invention

The present invention relates generally to a system and method for forming a polyurethane foam and, more specifically to, a system and method for forming a polyurethane foam that includes mixing an additive with a resin component prior to mixing the resin component with an isocyanate component to form the polyurethane foam.

2. Description of the Related Art

A foam dispensing system for dispensing spray polyurethane foam (SPF) includes a source of resin component, e.g., polyol, a source of isocyanate component, a proportioner for mixing selected ratios of the resin component and the isocyanate component to form the polyurethane foam, and a gun from spraying the polyurethane foam. The application of the polyurethane foam can, for example, be used for thermal insulation such as for appliances, buildings, marine floatation, coatings, and packaging.

In the distant past, foam dispensing systems routinely used third stream dosing equipment to allow for additions of blowing agents, typically gaseous chlorofluorocarbons (CFCs) such as Freon-11 and Freon-12, for improving yield and processing latitude for the spray foam. With the conversion away from CFC's to hydrochlorofluorocarbons (HCFC's) as blowing agents, one HCFC blowing agent such as HCFC-141b became the preferred blowing agent for the spray foam. Since HCFC-141b was a high boiling point liquid, it was possible to make spray foam based on HCFC-141b only. Therefore, spray foam equipment manufactures discontinued the manufacture of third stream dosing equipment.

In certain situations, it is beneficial to meter additives to the resin component before the resin component is mixed with the isocyanate component. Such additives can include, for example, hydrofluoroolefins (HFOs) as blowing agents, hydrofluorocarbons (HFCs) as blowing agents, gaseous blowing agents, flammable blowing agents, liquid carbon dioxide, water, fire retardants, cell openers, solid fillers, and/or catalysts.

Despite providing advantages, some additives that are mixed with the resin component to form a mixture can make the resin component/additive mixture reactive or unstable. For example, with the launch of next generation blowing agents, Zero Ozone Depletion Potential (ODP) and Low Global Warming Potential (GWP) blowing agents such as hydrofluoro-olefines (HFOs) have immediate shelf stability issues with one or more of the HFO molecules. As such, an unusable state of the resin component/additive mixture can be a state in which the mixture could rupture its holding tank, be in a combustible state, and/or not have a suitable chemical make-up for its intended purpose. When such an additive is metered into the resin component to form a mixture, the resin component/additive mixture reaches the unusable state after a given period of time.

In the case of additives that create an unusable resin component/additive mixture, the additive is metered to the resin component in a batch process. In other words, the additive is metered to the resin component in a temporary holding tank, i.e., a day tank, to form the resin component/additive mixture and is immediately used. The resin component/additive mixture that is not used before the resin component/additive mixture reaches an unusable state is discarded, which is economically unwanted. In addition, equipment to make such resin component/additive mixtures is often expensive and designed for use with only one additive.

Accordingly, it would be advantageous to develop a system and method for metering an additive to a resin component to form a resin component/additive mixture and using the resin component/additive mixture with an isocyanate component to form a polyurethane foam before the resin component/additive mixture reaches an unusable state.

SUMMARY OF THE INVENTION

Accordingly, the present invention is a method for forming a polyurethane foam. The method includes the steps of supplying an isocyanate component from a source of isocyanate to a proportioner, supplying a resin component from a source of resin to a metering unit, and supplying an additive having an unstable state from a source of additive to the metering unit. The method also includes the steps of forming on demand a reactive mixture of the resin component and the additive by the metering unit and delivering the reactive mixture by the metering unit to an accumulator and storing the reactive mixture in the accumulator. The method further includes the steps of demanding a supply of the reactive mixture with the proportioner, supplying the reactive mixture by the accumulator to the proportioner, and mixing the reactive mixture with the isocyanate component by the proportioner to form the polyurethane foam.

In addition, the present invention is a system for forming a polyurethane foam. The system includes a proportioner receiving an isocyanate component supplied from a source of isocyanate and a metering unit receiving a resin component supplied from a source of resin and an additive having an unstable state supplied from a source of additive to form a reactive mixture of the resin component and the additive on demand by the proportioner. The system also includes an accumulator disposed between the metering unit and the proportioner to receive the reactive mixture delivered from the metering unit and to store the reactive mixture therein for the proportioner. The proportioner demands the reactive mixture from the accumulator and the accumulator supplies the reactive mixture to the proportioner and the proportioner mixes the reactive mixture with the isocyanate component to form the polyurethane foam.

One advantage of the present invention is that a system and method for forming polyurethane foam meters an additive to a resin component to form a resin component/additive mixture and uses the resin component/additive mixture with an isocyanate component to form a polyurethane foam. Another advantage of the present invention is that the system and method provides stability since the additive is metered to the resin component based on demand created by the proportioner, the reactive mixture can be quickly used before the reactive mixture reaches an unusable state. Yet another advantage of the present invention is that the system and method, in addition, provides on demand metering of the additive to the resin component that reduces the likelihood that too little to too much reactive mixture is formed. Still another advantage of the present invention is that the system and method provides on demand metering, because the additive is metered to the resin component on demand, the ratio of additive metered to the resin component can be adjusted on the fly to accommodate for changes desired in the characteristic of the polyurethane foam, changes in atmospheric/environmental conditions, etc. A further advantage of the present invention is that the system and method provide unlimited formulation and raw material options that would allow for unlimited shelf life as sell as allow the use of raw materials that have previously been inaccessible to formulators either due to vapor pressure, flash point, or chemical incompatibility with other raw materials.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Referring to the Figures, wherein like numerals indicate like parts throughout the several views, one embodiment of a foam dispensing system 10, according to the present invention, is shown. The foam dispensing system 10 is a two component system for combining a resin component and an isocyanate component to create a spray polyurethane foam (SPF). As set forth below, the foam dispensing system 10 includes an additive mixed with the resin component to form a blended resin component/additive or reactive mixture prior to mixture with isocyanate component. It should be appreciated that the foam dispensing system 10 mixes the reactive mixture and isocyanate component together to form the polyurethane foam and dispenses the polyurethane foam therefrom.

With respect to the polyurethane foam, the resin and isocyanate components are rapidly mixed together and a rapid cross-linking reaction and foam expansion commences, which ultimately yields a low density, but relatively high load bearing, rigid polyurethane foam. The application of the polyurethane foam can, for example, be used for thermal insulation such as for appliances, buildings, marine floatation, coatings, and packaging. It should be appreciated that the resin component and the isocyanate component can include other additives such as foaming agents, curing agents, catalysts, accelerators, as well as other modifying additives.

Figure 1:
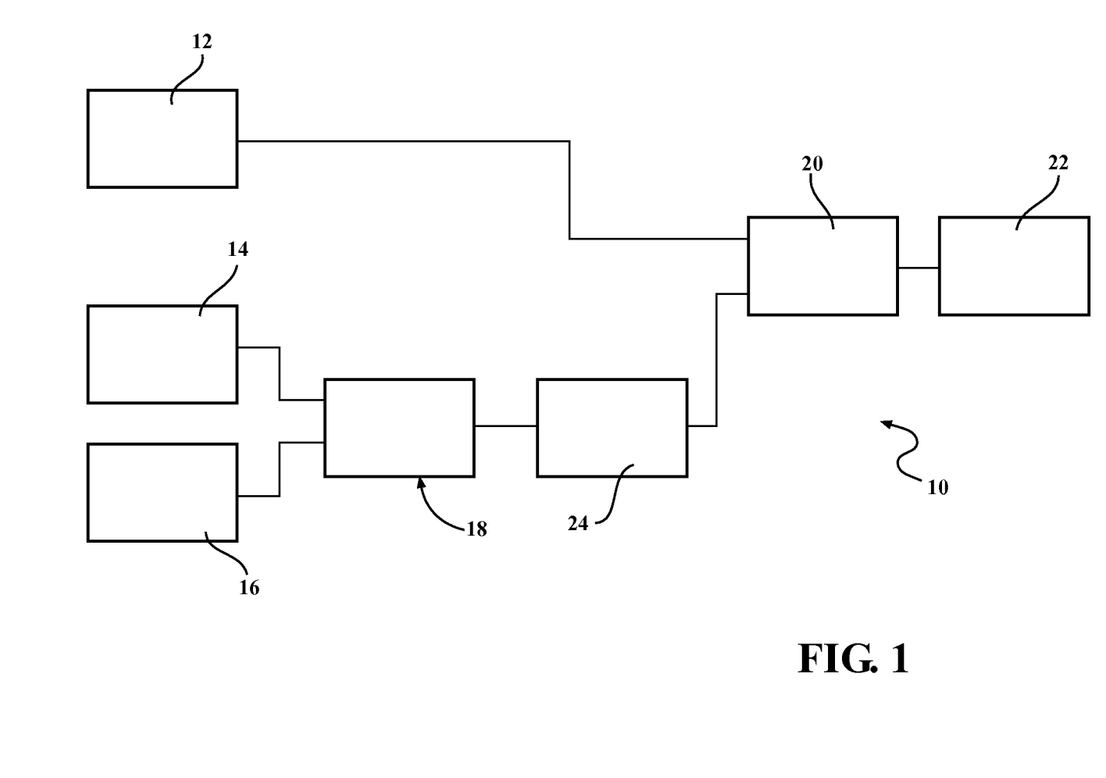
FIG. 1 is a schematic view of one embodiment of a foam dispensing system, according to the present invention.
Figure 1A:
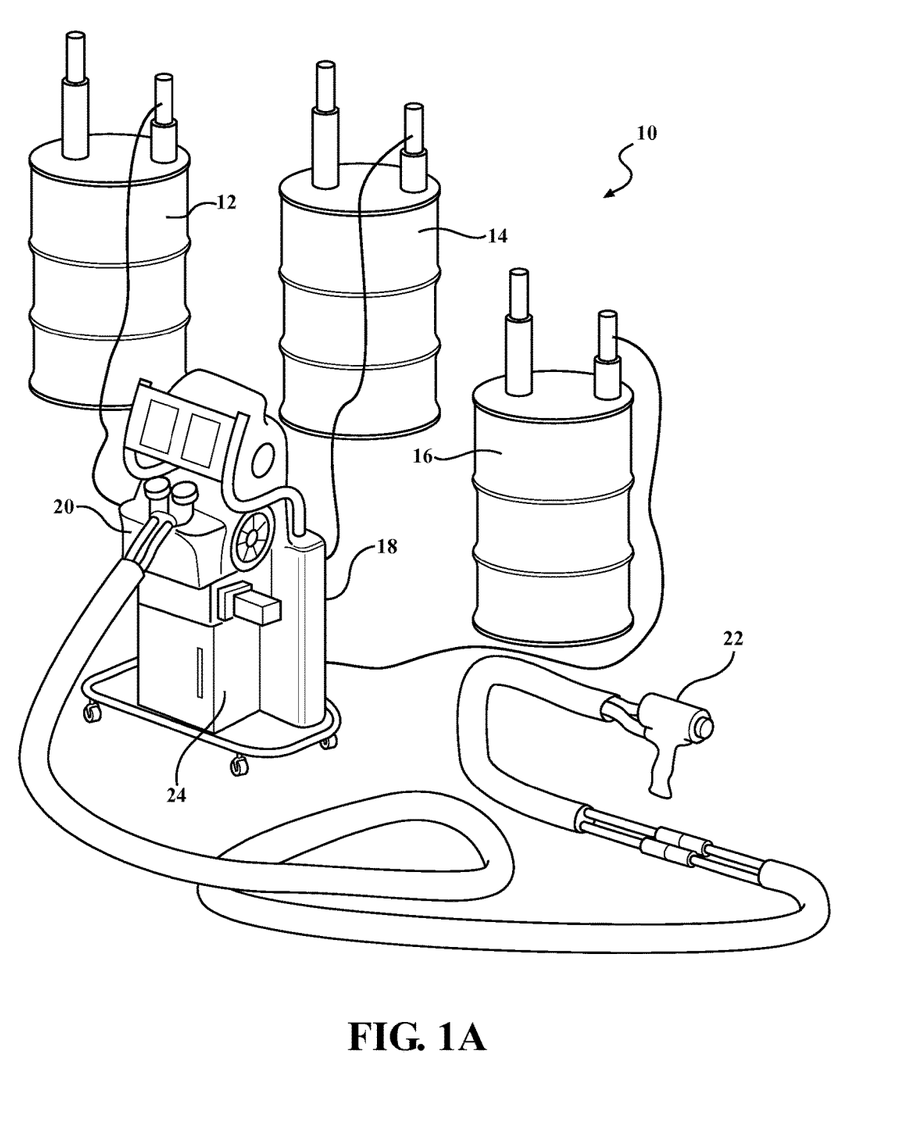
FIG. 1A is a perspective view of the foam dispensing system, according to the present invention, of FIG. 1.

Referring to FIGS. 1 and 1A, one embodiment of the foam dispensing system 10 includes a source 12 of isocyanate component, a source 14 of resin component, and a source 16 of additive. The source 12 of isocyanate component, the source 14 of resin component, and the source 16 of additive are each typically drums. It should be appreciated that the drums each include a drum pump for pumping the isocyanate component, resin component, and additive from the drums. It should also be appreciated that the additive could also be metered by an additional transfer pump, pressure vessel, or container (not shown).

The foam dispensing system 10 also includes a metering unit, generally indicated at 18, connected to the source 14 of resin component and the source 16 of additive. As set forth below, the metering unit 18 meters the additive to the resin component on demand. The foam dispensing system 10 further includes a proportioner 20 operatively connected to the source 12 of isocyanate component and to the metering unit 18. The proportioner 20 mixes the blended resin component/additive or reactive mixture (i.e., the resin component/additive combination) with the isocyanate component to form the polyurethane foam. The proportioner 20 is adjustable to adjust a ratio of the reactive mixture and the isocyanate component. The foam dispensing system 10 also includes a spray gun 22 connected to the proportioner 20 to spray the polyurethane foam onto a selected substrate (not shown). The foam dispensing system 10 further includes an accumulator 24 disposed between the metering unit 18 and the proportioner 20, as set forth further below. It should be appreciated that the accumulator 24 receives the reactive mixture from the metering unit 18 and stores the reactive mixture until demanded by the proportioner 20. It should also be appreciated that the accumulator 24 may be any type of relatively small vessel to act as a temporary storage unit for the reactive mixture.

Figure 2:
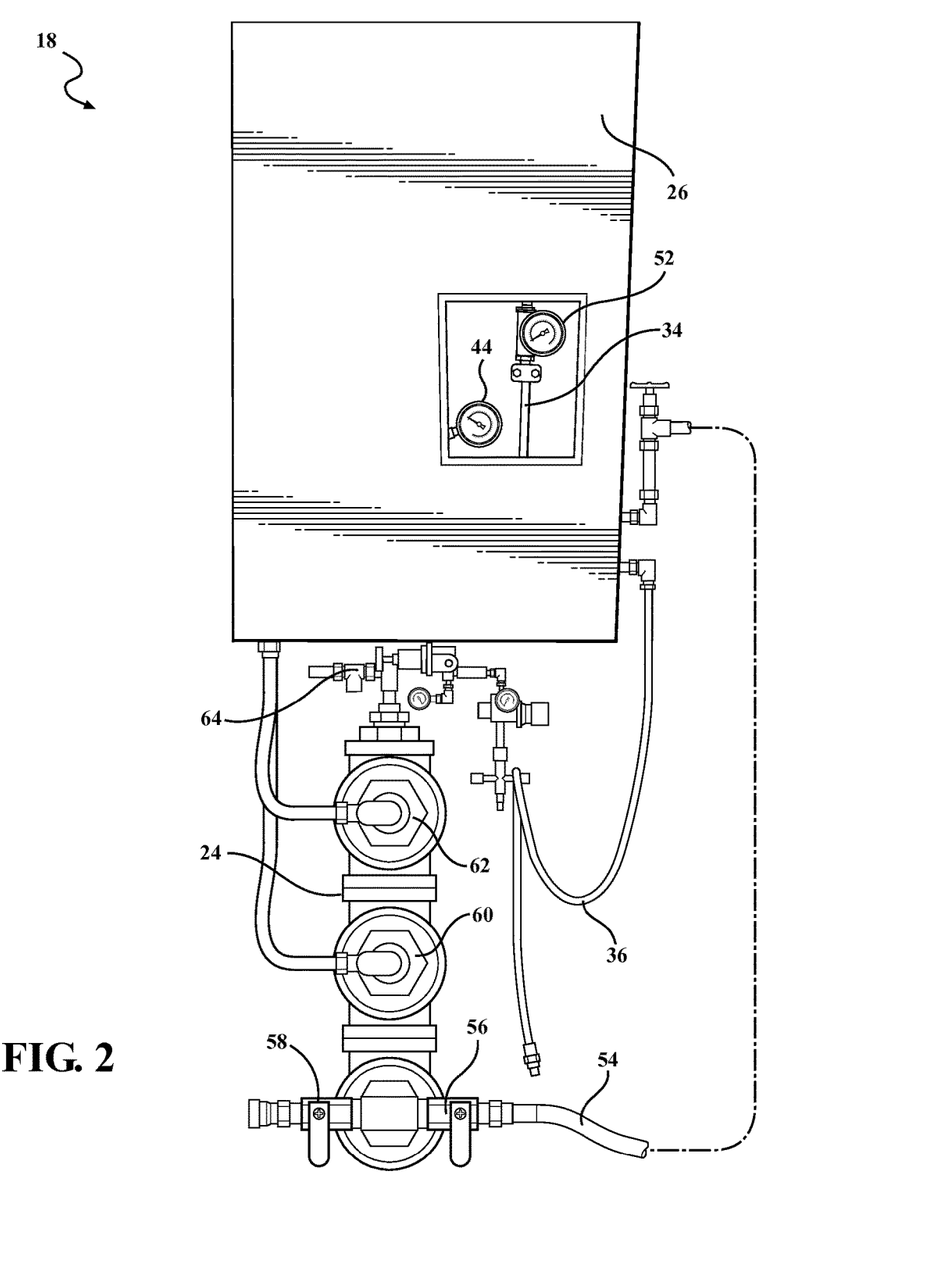
FIG. 2 is a front elevational view of a metering unit and an accumulator of the foam dispensing system of FIGS. 1 and 1A.
Figure 3:
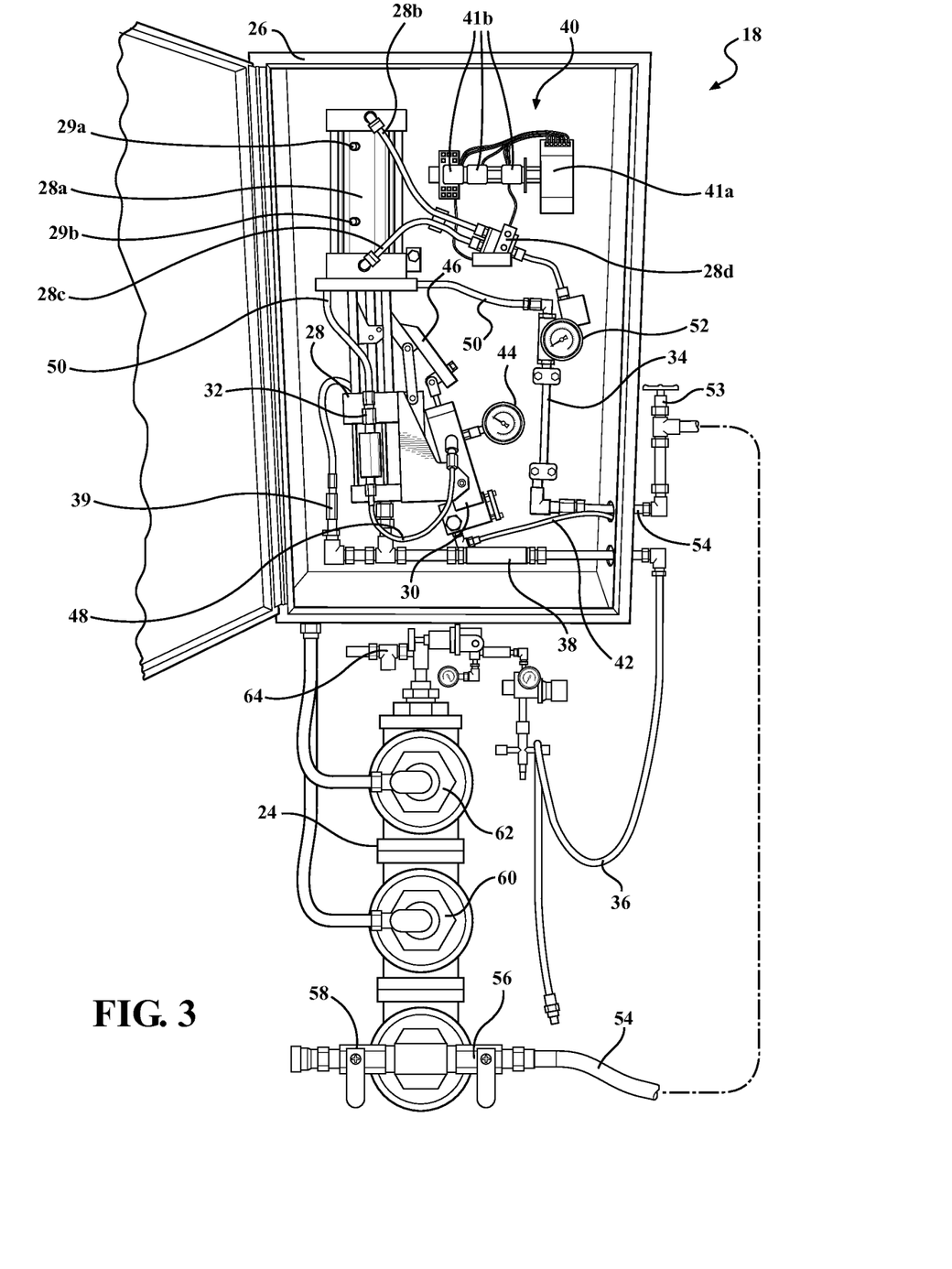
FIG. 3 is view similar to FIG. 2 illustrating an interior of the metering unit FIG. 2.
Figure 4:
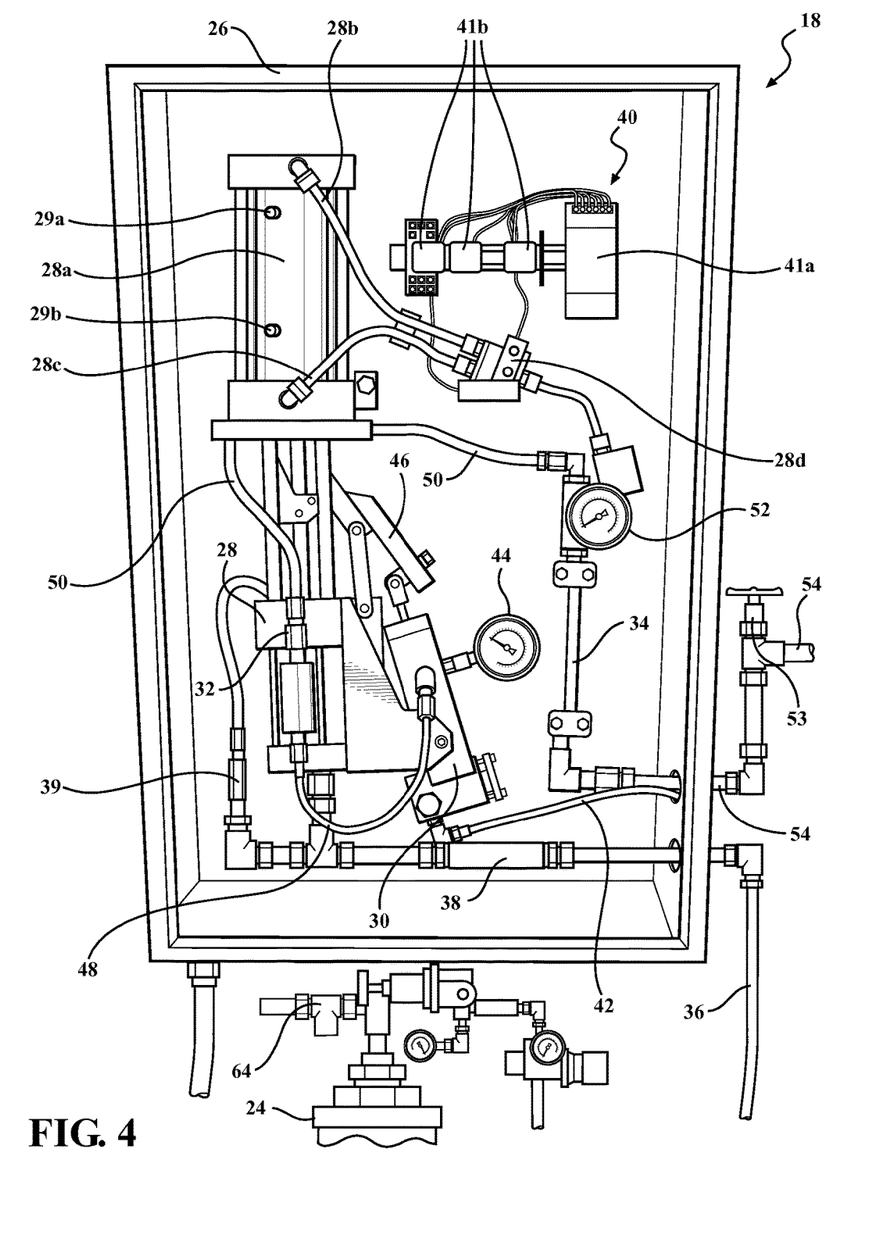
FIG. 4 is an enlarged front elevational view of the metering unit of FIG. 3.
Figure 5:
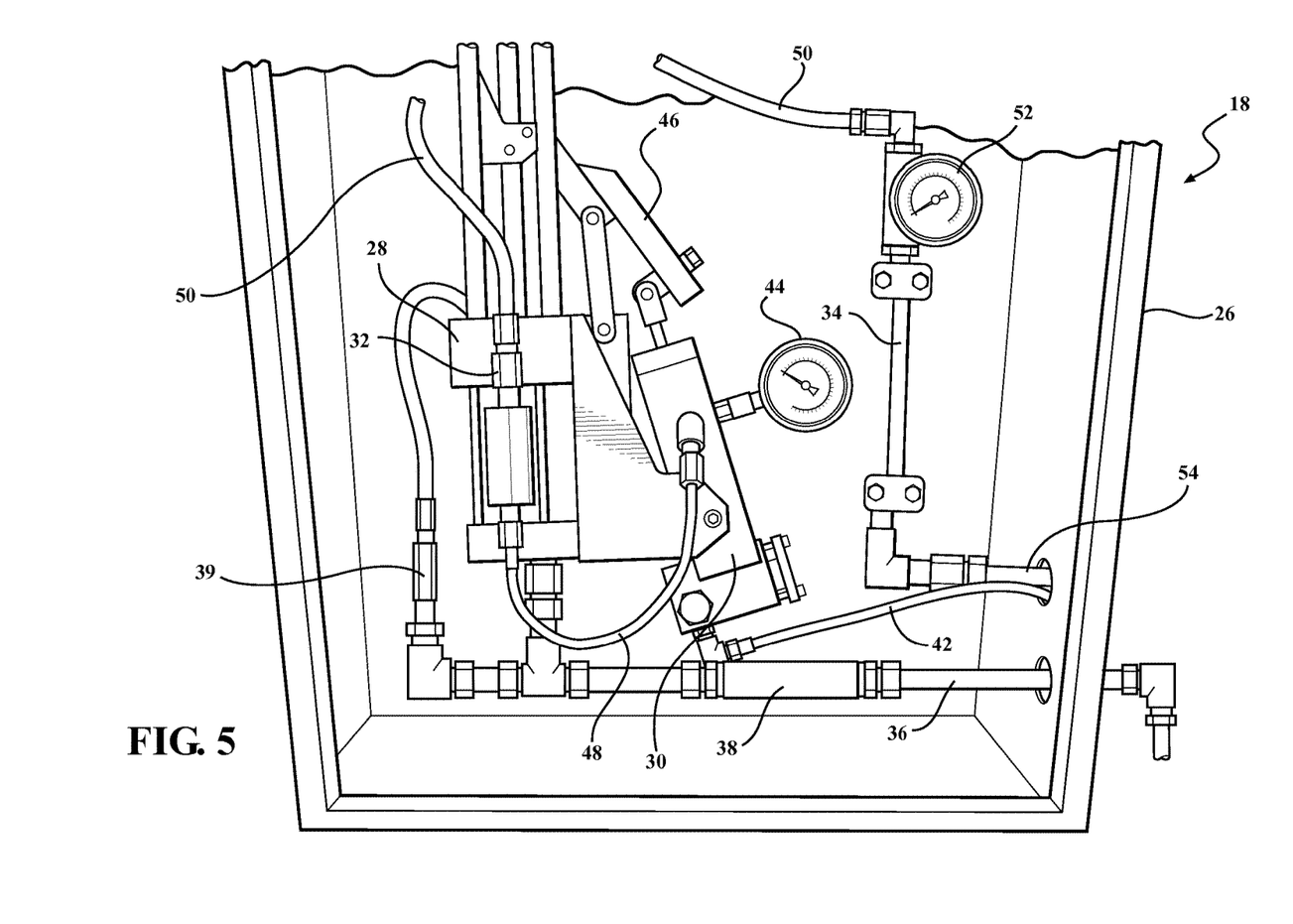
FIG. 5 is an enlarged front elevational view of a portion of the metering unit of FIG. 3.
Figure 6:
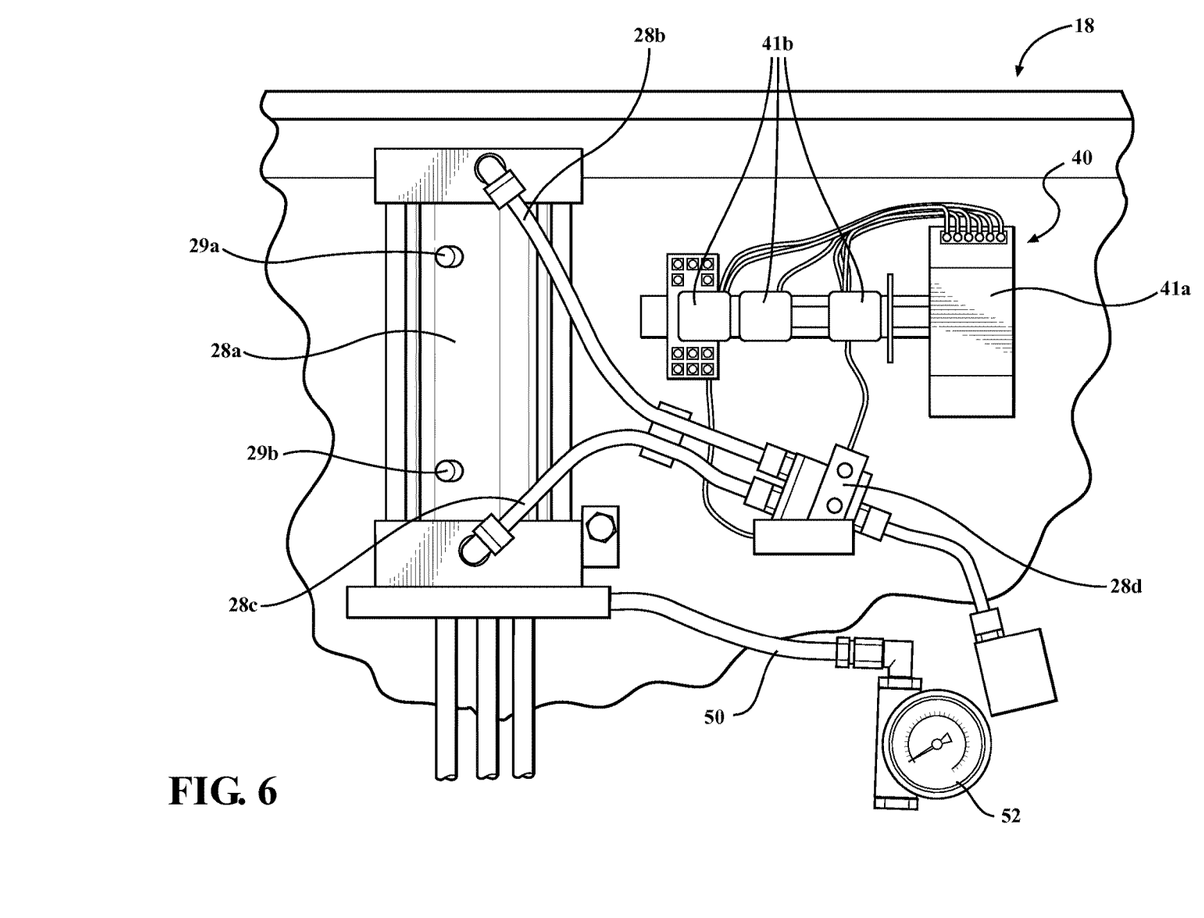
FIG. 6 is an enlarged front elevational view of another portion of the metering unit of FIG. 3.

Referring to FIGS. 2-4, the metering unit 18 can be a self-contained unit that can be mounted to a spray foam machine or mounted on a wall of a spray rig (not shown). As illustrated in FIGS. 2-4, the metering unit 18 includes a case 26 and the accumulator 24 is disposed below the case 26 in the figures. It should be appreciated that the case 26 houses the components to be described of the metering unit 18.

The metering unit 18 includes a resin pump 28 connected to the source 14 of resin component and an additive pump 30 connected to the source 16 of additive. The resin pump 28 is, for example, a pneumatic pump having a pump air cylinder 28a with pump air inlets 28b and 28c connected to a solenoid valve 28d. The resin pump 28 also has a magnetic stroke sensor 29a for a downstroke and magnetic stroke sensor 29b for an upstroke. It should be appreciated that the solenoid valve 28d is connected to a source (not shown) of air.

The metering unit 18 includes an output 32 connected to the resin pump 28 and the additive pump 30. The metering unit 18 includes a blended line 50 connected to the output 32 and a static mixer 34 connected to the output 32 via the blended line 50 to mix the resin component and the additive to form the reactive mixture. The static mixer 34 is connected to the accumulator 24 via an output line 54 to be described to supply the reactive mixture to the accumulator 24. The metering unit 18 also includes a resin inlet line 36 connecting the resin pump 28 to the source 14 of resin component and a check valve 38 connected to the resin inlet line 36 before the resin pump 28 and a check valve 39 connected to the resin inlet line 36 after the resin pump 28 to control back pressure. It should be appreciated that the pumps 28 and 30 may be of a piston style to minimize costs, but may be other pump styles depending on the material to be added. It should also be appreciated that the resin component and additive are run through the static mixer 34 under pressure to insure proper mixing.

The metering unit 18 includes an electronic control system 40 for communicating with and controlling the pumps 28 and 30. The electronic control system 40 communicates with the resin pump 28 and the resin pump 28 is controlled by the electronic control system 40. The electronic control system 40 communicates with the additive pump 30 and the additive pump 30 is controlled by the electronic control system 40. The electronic control system 40 includes a power supply 41a and a plurality of relays 41b electrically connected to the resin pump 28 and additive pump 30. The electronic control system 40 is also electrically connected to the stroke sensors 29a and 29b of the resin pump 28 to adjust pump volume and stroke length of the resin pump 28 for different materials. It should be appreciated that the electronic control system 40 turns on and off the resin pump 28 and the additive pump 30 of the metering unit 18 to meter the resin component and additive component through the static mixer 34 to insure proper mixing to form the reactive mixture and delivering the reactive mixture to the accumulator 24.

The metering unit 18 also includes an additive inlet line 42 connecting the additive pump 30 to the source 16 of additive. The additive pump 30 includes a pressure gauge 44. The additive pump 30 includes a pump volume control 46 configured to adjust the output of additive from the additive pump 30. The pump volume control 46, for example, adjusts the stroke length of the additive pump 30. The metering unit 18 further includes an additive outlet line 48 connecting the additive pump 30 to the output 32 to supply the additive to the output 32. It should be appreciated that the pump control volume 56 is connected to the electronic control system 40.

The metering unit 18 includes a blended line 50 connecting the output 32 to the static mixer 34. The static mixer 34 includes a backpressure gauge 52. The foam dispensing system 10 also includes an output line 54 connecting the static mixer 34 with the accumulator 24 and an output stream back pressure regulator 53 connected to the output line 54 to prevent the additive, when in a gaseous form at high pressure, from bypassing the static mixer 34. It should be appreciated that the accumulator 24 handles fluctuations in the flow rates of the reactive mixture from the metering unit 18 to the proportioner 20.

Figure 7:
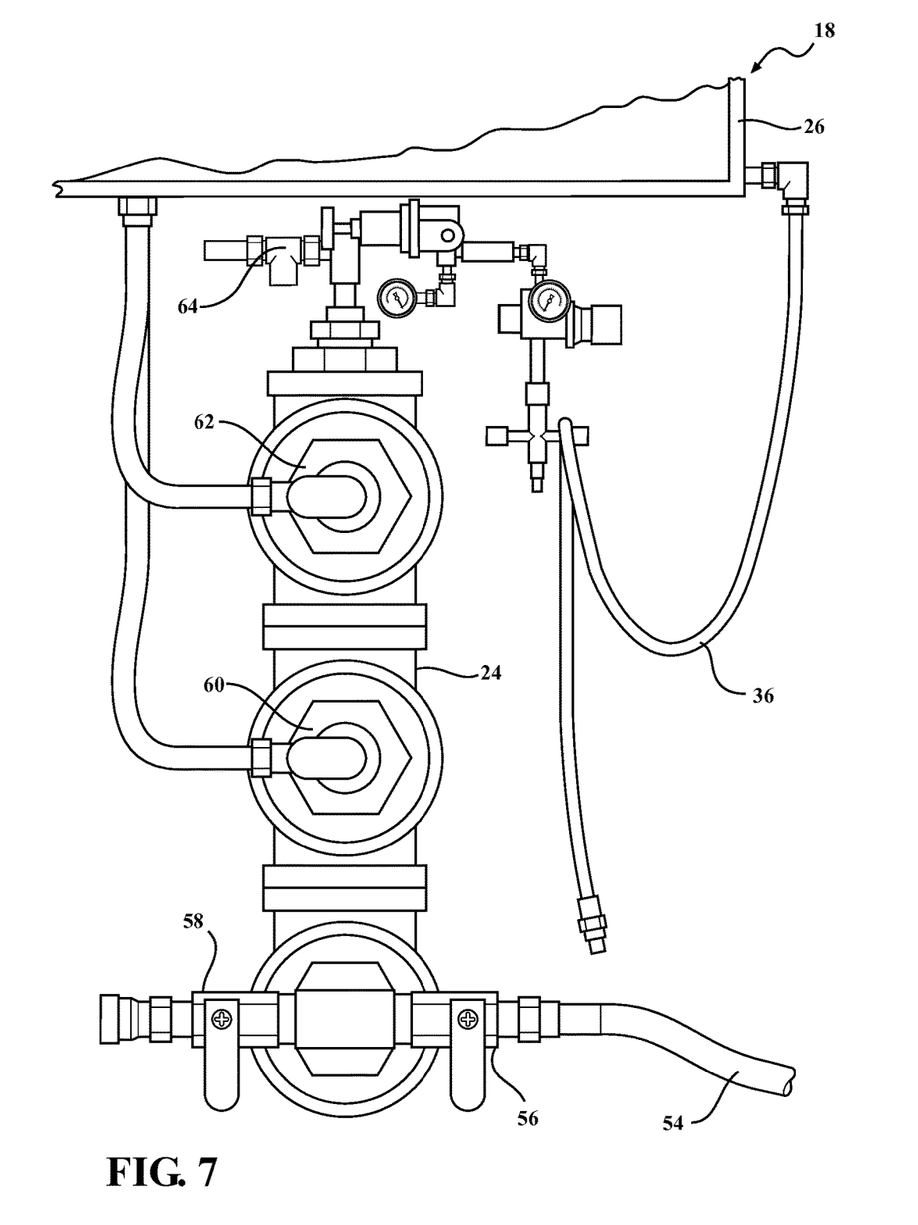
FIG. 7 is an enlarged elevational view of the accumulator of FIG. 2.

Referring to FIG. 7, the foam dispensing system 10 includes the accumulator 24. The accumulator 24 receives and stores the reactive mixture for use on demand from the proportioner 20. In other words, the accumulator 24 compensates for surges in flow rate demand and for delays in starting and stopping the pumps 28 and 30. The foam dispensing system 10 further includes shut-off valves 56, 58 disposed upstream and downstream, respectively, of the accumulator 24 to isolate the accumulator, if necessary. It should be appreciated that the shut-off valves 56, 58 are conventional valves.

As illustrated in FIG. 7, the accumulator 24 includes a low level sensor 60 and a high level sensor 62 for tracking the amount of reactive mixture in the accumulator 24. Specifically, the level sensors 60, 62 communicate with the electronic control system 40 to activate/deactivate the resin pump 28 and the additive pump 30. The accumulator 24 includes an overpressure dump valve 64 for releasing pressure in the accumulator 24. It should be appreciated that the volume of the accumulator 24 is minimized to limit possible waste generated as the foam dispensing system 10 sits idle and resin component potentially degrades in the accumulator 24. It should also be appreciated that the accumulator 24 meters the reactive mixture to the proportioner 20 on demand, i.e., when the level of reactive mixture in the accumulator 24 falls below a predetermined level.

The blended resin component or reactive mixture, i.e., the combination of the resin component and the additive, is formed on demand. In other words, when the proportioner 20 draws resin component from accumulator 24 and the level of resin component drops below the low level sensor 60, the metering unit 18 meters the additive to the resin component and supplies the resulting blended resin component to the accumulator 24. Said differently the metering unit 18 does not mix the resin component and the additive until demand from the proportioner 20 demands additional blended resin component, i.e., by drawing the level of the blended resin component in the accumulator 24 below the low level sensor 60. Further, if demand from the accumulator 24 is eliminated for period of time sufficient for the blended resin component to degrade to an unusable state, the only wasted material is that in the lines downstream of the output 32 and in the accumulator 24.

Since the blended resin component/additive mixture is only mixed based on demand from the proportioner 20, the blended resin component/additive mixture can be a reactive or unstable mixture. In other words, the blended resin component/additive mixture is used on demand and thus is used in the proportioner 20 before degrading to an unusable state. For example, the unusable state can be a state in which the reactive mixture could rupture its holding tank, be in a combustible state, and/or not have a suitable chemical make-up for its intended purpose.

The additive can be, for example, a blowing agent, a fire retardant, a cell opener, a solid filler, water, and/or a catalyst. For example, the additive can be hydrofluoroolefins (HFOs), next generation HFOs, or liquid hydrofluorocarbons (HFC) used as a blowing agent in which the unusable state can be a combustible state and/or degraded chemical make-up, i.e., expired shelf life. The blowing agent can be a liquid blowing agent (LBA) such as Solstice LBA from Honeywell Corporation. The additive can be a gaseous blowing agent in which the unusable state can rupture its holding tank. The blowing agent can be a gaseous blowing agent (GBA) such as Soltice GBA from the Honeywell Corporation or HCF-134a. The additive can be a flammable blowing agent in which the unusable state can be a combustible state. The additive can be water in which the unusable state can be a degraded chemical make-up, i.e., expired shelf life. The additive can be a fire retardant, cell opener, and/or solid filler in which the unusable state can be a degraded chemical make-up, i.e., expired shelf life.

The additive can be a catalyst which the unusable state can be a degraded chemical make-up, i.e., expired shelf life. In such an embodiment, the pump volume control 46 can be used to adjust a ratio of catalyst mixed with the resin component to accommodate for change in ambient temperatures in the field.

One embodiment of a method, according to the present invention, for forming the polyurethane foam is set forth below. The method includes the step of supplying the isocyanate component to the proportioner 20. Specifically, the isocyanate component is pumped from the source 12 of isocyanate component to the proportioner 20 with the drum pump in the source 12.

The method also includes the step of supplying the resin component to the metering unit 18. Specifically, the resin component is pumped from the source 14 of resin component to the mixing unit 18 with the drum pump in the source 14.

The method further includes the step of supplying the additive to the metering unit 18. Specifically, the additive can be pumped from the source 16 of additive to the metering unit 18 with the pump in the source 16. As set forth above, the resin component and the additive form a reactive mixture when combined. In other words, the blended resin component/additive can be a reactive mixture.

The method includes the step of mixing the resin component and the additive in the metering unit 18 to form the reactive mixture, i.e., the blended resin component/additive. The method also includes the step of adjusting the ratio of additive mixed with the resin component. For example, the method includes the step of adjusting the pump volume control 46. The metering unit 18 mixes the resin component and the additive in response to demand by the proportioner 20. The method further includes the steps of delivering the reactive mixture to the accumulator 24 and storing the reactive mixture in the accumulator 24.

The method also includes the step of demanding a supply of the reactive mixture, i.e., blended resin component/additive, with the proportioner 20. In other words, the resin component and the additive are only mixed when the proportioner 20 demands the blended resin component/additive. The blended resin component/additive can be demanded by the proportioner 20, for example, when the proportioner 20 draws the level of blended resin component/additive below the low level sensor 60 in the accumulator 24. The method further includes the step of supplying the reactive mixture, i.e., the blended resin component, by the accumulator 24 to the proportioner 20 in response to demand by the proportioner 20 and mixing the reactive mixture with the isocyanate component by the proportioner 20 to form the polyurethane foam. The method includes the step of spraying the polyurethane foam with a spray gun 22 onto a selected substrate.

The isocyanate component may include, but is not limited to, isocyanates, diisocyanates, polyisocyanates, biurets of isocyanates and polyisocyanates, isocyanurates of isocyanates and polyisocyanates, and combinations thereof. In one embodiment, the isocyanate component includes an n-functional isocyanate, wherein "n" may be a number from 2 to 5, from 2 to 4, or from 3 to 4. It is to be understood that "n" may be an integer or may have intermediate values from 2 to 5. The isocyanate component may include an isocyanate selected from the group of aromatic isocyanates, aliphatic isocyanates, and combinations thereof. In another embodiment, the isocyanate component includes an aliphatic isocyanate such as hexamethylene diisocyanate, H12MDI, and combinations thereof. If the isocyanate component includes an aliphatic isocyanate, the isocyanate component may also include a modified multivalent aliphatic isocyanate, i.e., a product which is obtained through chemical reactions of aliphatic diisocyanates and/or aliphatic polyisocyanates. Examples include, but are not limited to, ureas, biurets, allophanates, carbodiimides, uretonimines, isocyanurates, urethane groups, dimers, trimers, and combinations thereof. The isocyanate component may also include, but is not limited to, modified diisocyanates employed individually or in reaction products with polyoxyalkyleneglycols, diethylene glycols, dipropylene glycols, polyoxyethylene glycols, polyoxypropylene glycols, polyoxypropylenepolyoxethylene glycols, polyesterols, polycaprolactones, and combinations thereof.

Alternatively, the isocyanate component may include an aromatic isocyanate. If the isocyanate component includes an aromatic isocyanate, the aromatic isocyanate may correspond to the formula $R'(NCO)_z$ wherein R' is aromatic and z is an integer that corresponds to the valence of R'. Preferably, z is at least two. Suitable examples of aromatic isocyanates include, but are not limited to, tetramethylxylylene diisocyanate (TMXDI), 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitro-benzene, 2,5-diisocyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, 3,3'-dimethyldiphenylmethane-4,4'-diisocyanate, triisocyanates such as 4,4',4"-triphenylmethane triisocyanate polymethylene polyphenylene polyisocyanate and 2,4,6-toluene triisocyanate, tetraisocyanates such as 4,4'-dimethyl-2,2'-5,5'-diphenylmethane tetraisocyanate, toluene diisocyanate, 2,2'-diphenylmethane diisocyanate, 2,4'-diphenylmethane diisocyanate, 4,4'-diphenylmethane diisocyanate, polymethylene polyphenylene polyisocyanate, corresponding isomeric mixtures thereof, and combinations thereof. Alternatively, the aromatic isocyanate may include a triisocyanate product of m-TMXDI and 1,1,1-trimethylolpropane, a reaction product of toluene diisocyanate and 1,1,1-trimethyolpropane, and combinations thereof. In one embodiment, the isocyanate component includes a diisocyanate selected from the group of methylene diphenyl diisocyanates, toluene diisocyanates, hexamethylene diisocyanates, H12MDIs, and combinations thereof.

The isocyanate component may have any % NCO content and any viscosity. The isocyanate component may also react with the resin and/or chain extender in any amount, as determined by one skilled in the art. Preferably, the isocyanate component and the resin and/or chain extender are reacted at an isocyanate index from 15 to 900, more preferably from 95 to 130, and alternatively from 105 to 130.

The resin component of the present invention may include one or more of a polyether polyol, a polyester polyol, and combinations thereof. As is known in the art, polyether polyols are typically formed from a reaction of an initiator and an alkylene oxide. Preferably, the initiator is selected from the group of aliphatic initiators, aromatic initiators, and combinations thereof. In one embodiment, the initiator is selected from the group of ethylene glycol, propylene glycol, dipropylene glycol, butylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, butenediol, butynediol, xylylene glycols, amylene glycols, 1,4-phenylene-bis-beta-hydroxy ethyl ether, 1,3-phenylene-bis-beta-hydroxy ethyl ether, bis-(hydroxy-methyl-cyclohexane), thiodiglycol, glycerol, 1,1,1-trimethylolpropane, 1,1,1-trimethylolethane, 1,2,6-hexanetriol, α-methyl glucoside, pentaerythritol, sorbitol, aniline, o-chloroaniline, p-aminoaniline, 1,5-diaminonaphthalene, methylene dianiline, the condensation products of aniline and formaldehyde, 2,3-, 2,6-, 3,4-, 2,5-, and 2,4-diaminotoluene and isomeric mixtures, methylamine, triisopropanolamine, ethylenediamine, 1,3-diaminopropane, 1,3-diaminobutane, 1,4-diaminobutane, propylene diamine, butylene diamine, hexamethylene diamine, cyclohexalene diamine, phenylene diamine, tolylene diamine, xylylene diamine, 3,3'-dichlorobenzidine, 3,3'- and dinitrobenzidine, alkanol amines including ethanol amine, aminopropyl alcohol, 2,2-dimethyl propanol amine, 3-aminocyclohexyl alcohol, and p-aminobenzyl alcohol, and combinations thereof. It is contemplated that any suitable initiator known in the art may be used in the present invention.

Preferably, the alkylene oxide that reacts with the initiator to form the polyether polyol is selected from the group of ethylene oxide, propylene oxide, butylene oxide, amylene oxide, tetrahydrofuran, alkylene oxide-tetrahydrofuran mixtures, epihalohydrins, aralkylene oxides, and combinations thereof. More preferably, the alkylene oxide is selected from the group of ethylene oxide, propylene oxide, and combinations thereof. Most preferably, the alkylene oxide includes ethylene oxide. However, it is also contemplated that any suitable alkylene oxide that is known in the art may be used in the present invention.

The polyether polyol may include an ethylene oxide cap of from 5 to 20% by weight based on the total weight of the polyether polyol. It is to be understood that the terminology "cap" refers to a terminal portion of the polyether polyol. Without intending to be bound by any particular theory, it is believed that the ethylene oxide cap promotes an increase in a rate of the reaction of the polyether polyol and the isocyanate.

The polyether polyol may also have a number average molecular weight of from 18 to 10,000 g/mol. Further, the polyether polyol may have a hydroxyl number of from 15 to 6,250 mg KOH/g. The polyether polyol may also have a nominal functionality of from 2 to 8. Further, further, the polyether polyol may also include an organic functional group selected from the group of a carboxyl group, an amine group, a carbamate group, an amide group, and an epoxy group.

Referring now to the polyester polyols introduced above, the polyester polyols may be produced from a reaction of a dicarboxylic acid and a glycol having at least one primary hydroxyl group. Suitable dicarboxylic acids may be selected from the group of, but are not limited to, adipic acid, methyl adipic acid, succinic acid, suberic acid, sebacic acid, oxalic acid, glutaric acid, pimelic acid, azelaic acid, phthalic acid, terephthalic acid, isophthalic acid, and combinations thereof. Suitable glycols include, but are not limited to, those described above.

The polyester polyol may also have a number average molecular weight of from 80 to 1500 g/mol. Further, the polyester polyol may have a hydroxyl number of from 40 to 600 mg KOH/g. The polyester polyol may also have a nominal functionality of from 2 to 8. Further, further, the polyester polyol may also include an organic functional group selected from the group of a carboxyl group, an amine group, a carbamate group, an amide group, and an epoxy group.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A method for forming a polyurethane foam, said method comprising the steps of:
    supplying an isocyanate component from a source of isocyanate directly to a proportioner;
    supplying a resin component from a source of resin to a metering unit by a resin pump;
    supplying an additive having an unstable state from a source of additive to the metering unit by an additive pump, the metering unit including an electronic control system comprising a plurality of relays communicating with the resin pump and additive pump;
    forming a reactive mixture comprising the resin component and the additive by the metering unit by adjusting a ratio of the additive mixed with the resin component, wherein the metering unit is configured to adjust the ratio on the fly to accommodate for changes desired in characteristics of the polyurethane foam and changes in atmospheric and environmental conditions;
    delivering the reactive mixture by the metering unit to an accumulator disposed between the metering unit and the proportioner and storing the reactive mixture in the accumulator for use on demand from the proportioner;
    demanding a supply of the reactive mixture with the proportioner;
    supplying the reactive mixture by the accumulator to the proportioner in response to the demand by the proportioner and mixing the reactive mixture with the isocyanate component by the proportioner to form the polyurethane foam; and
    tracking the amount of the reactive mixture in the accumulator by the electronic control system in communication with the accumulator and forming and delivering the reactive mixture to the accumulator when the amount of the reactive mixture in the accumulator is below a predetermined amount.

2. A method as set forth in claim 1 wherein said step of demanding comprises drawing the reactive mixture in the accumulator below a low level sensed by a low level sensor in the accumulator.

3. A method as set forth in claim 1 including the step of providing for the metering unit an output and a static mixer connected to the output to mix the resin component and the additive to form the reactive mixture.

4. A method as set forth in claim 3 including the step of providing an output line with an output stream back pressure regulator and connecting the output line to the static mixer and the accumulator to prevent the additive from bypassing the static mixer.

5. A method as set forth in claim 4 including the step of activating and deactivating the resin pump and the additive pump with the electronic control system.

6. A method as set forth in claim 4 including the step of adjusting a ratio of the additive mixed with the resin component by adjusting a pump volume control on the additive pump.

7. A method as set forth in claims 1 wherein the additive is one or more of a blowing agent, a fire retardant, a cell opener, water, a solid filler, and a catalyst.

8. A method as set forth in claim 7 wherein the blowing agent is one or more of hydrofluoroolefins (HFOs) or liquid hydrofluorocarbons (HFC).

9. A method as set forth in claim 7 wherein the blowing agent is one or more of a liquid blowing agent (LBA), a gaseous blowing agent (GBA), or a flammable blowing agent.

10. The method as set forth in claim 1, wherein the electronic control system is electrically connected to a pair of stroke sensors of the resin pump to adjust pump volume and stroke length of the resin pump for different materials.

11. A method for forming and spraying a polyurethane foam, said method comprising the steps of:
- supplying an isocyanate component from a source of isocyanate directly to a proportioner;
- supplying a resin component from a source of resin to a metering unit including a resin pump for the metering unit to pump the resin component, an additive pump for the metering unit to pump an additive, and an electronic control system comprising a plurality of relays communicating with the resin pump and the additive pump;
- supplying the additive having an unstable state from a source of additive to the metering unit;
- forming a reactive mixture comprising the resin component and the additive by the metering unit by adjusting a ratio of the additive mixed with the resin component by adjusting a pump volume control on the additive pump;
- delivering the reactive mixture by the metering unit to an accumulator disposed between the metering unit and the proportioner;
- storing the reactive mixture in the accumulator for use on demand from the proportioner;
- demanding a supply of the reactive mixture with the proportioner;
- supplying the reactive mixture by the accumulator to the proportioner in response to the demand by the proportioner drawing the reactive mixture in the accumulator below a low level sensed by a low level sensor in the accumulator communicating with the electronic control system and mixing the reactive mixture with the isocyanate component by the proportioner to form the polyurethane foam;
- connecting a spray gun to the proportioner and spraying the polyurethane foam onto a selected substrate; and
- tracking the amount of the reactive mixture in the accumulator by the electronic control system in communication with the accumulator and forming and delivering the reactive mixture to the accumulator when the amount of the reactive mixture in the accumulator is below the low level,
- wherein the metering unit is configured to adjust the ratio on the fly to accommodate for changes desired in characteristics of the polyurethane foam and changes in atmospheric and environmental conditions.

* * * * *